United States Patent
Watanabe

(10) Patent No.: US 11,002,604 B2
(45) Date of Patent: May 11, 2021

(54) CORRECTION METHOD OF DETECTION SIGNAL VALUE IN SPECTROPHOTOMETER AND SPECTROPHOTOMETER HAVING CORRECTION FUNCTION OF DETECTION SIGNAL VALUE

(71) Applicant: Shimadzu Corporation, Kyoto (JP)

(72) Inventor: Masato Watanabe, Kyoto (JP)

(73) Assignee: Shimadzu Corporation, Kyoto (JP)

(*) Notice: Subject to any disclaimer, the term of this patent is extended or adjusted under 35 U.S.C. 154(b) by 240 days.

(21) Appl. No.: 16/266,132

(22) Filed: Feb. 4, 2019

(65) Prior Publication Data

US 2020/0249090 A1    Aug. 6, 2020

(51) Int. Cl.
*G01J 3/18* (2006.01)
*G01J 3/28* (2006.01)
*G01J 3/02* (2006.01)

(52) U.S. Cl.
CPC .......... *G01J 3/2803* (2013.01); *G01J 3/0275* (2013.01); *G01J 3/18* (2013.01); *G01J 2003/2809* (2013.01)

(58) Field of Classification Search
CPC ................. G01J 3/2803; G01J 3/18
See application file for complete search history.

(56) References Cited

U.S. PATENT DOCUMENTS 9,188,486 B1    11/2015  Xu et al.
2014/0063496 A1  3/2014  Owa

FOREIGN PATENT DOCUMENTS

| JP | S57-139849 U | 9/1982 |
| JP | S63-243822 A | 10/1988 |
| JP | H05-133808 A | 5/1993 |
| JP | H06-167390 A | 6/1994 |
| JP | 2012-057944 A | 3/2012 |
| JP | 2014-048176 A | 3/2014 |

OTHER PUBLICATIONS

Notice of Reasons for Refusal from the Japanese Patent Office, dated Oct. 1, 2019, for corresponding Japanese Patent Application No. 2016-165235.

*Primary Examiner* — Maurice C Smith
(74) *Attorney, Agent, or Firm* — Muir Patent Law, PLLC

(57) ABSTRACT

The purpose is to reduce the influence on the measurement due to high order diffracted light without arranging a filter for removing high order diffracted light between a diffraction grating and a PDA. The correction method includes a correction coefficient determination step of determining a correction coefficient related to a ratio of a portion of a detection signal value to the detection signal value, the portion of the detection signal value being derived from a second order diffracted light of light in the first wavelength range contained in the detection signal value of a long wavelength side photodiode for detecting light in the second wavelength range in the photodiode array, and a correction unit configured to obtain a corrected detection signal value derived from light in the second wavelength range from a different detection signal value of the long wavelength side photodiode by using the correction coefficient determined by the correction coefficient determination step.

10 Claims, 1 Drawing Sheet

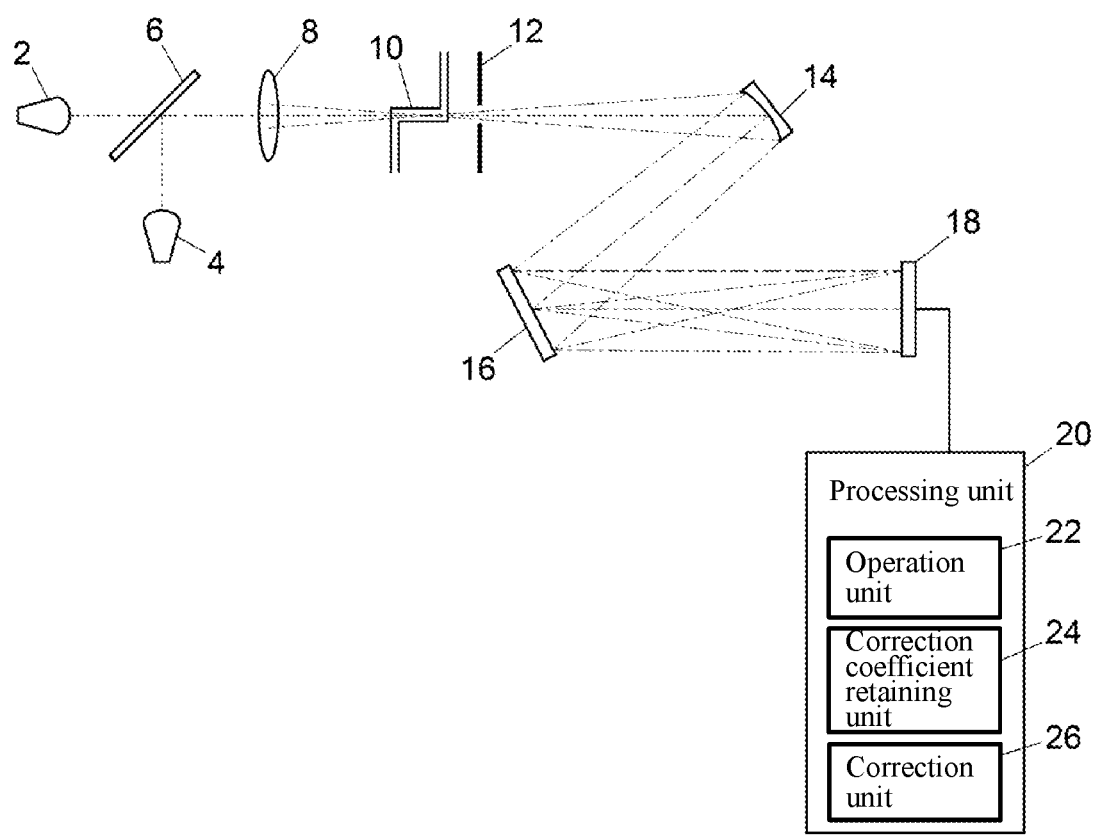

CORRECTION METHOD OF DETECTION SIGNAL VALUE IN SPECTROPHOTOMETER AND SPECTROPHOTOMETER HAVING CORRECTION FUNCTION OF DETECTION SIGNAL VALUE

TECHNICAL FIELD

The present invention relates to a spectrophotometer configured to spectrally disperse light from a flow cell for each wavelength component using a diffraction grating and detect the spectrally dispersed light for each wavelength component using a photodiode array (hereinafter referred to as "PDA"), and also relates to a correction method of a detection signal value of the PDA.

BACKGROUND ART

As a detector for a liquid chromatograph, a PDA spectrophotometer is known. In a PDA spectrophotometer, light is irradiated from a light source to a flow cell through which a solution containing a sample flows, and the light that passed through the flow cell or the light reflected (or refracted) is spectrally dispersed by a diffraction grating for each wavelength component and led to a PDA. The PDA is provided with a plurality of photodiodes for receiving the light of each wavelength component spectrally dispersed by the diffraction grating, so that the wavelength spectrum of the light that passed through the flow cell can be detected by simultaneously detecting light of each wavelength component by each photodiode (see Patent Document 1).

PRIOR ART DOCUMENT

Patent Document
Patent Document 1: Japanese Unexamined Patent Application Publication No. 2014-048176
Patent Document 2: Japanese Unexamined Patent Application Publication No. H5-133808

SUMMARY OF THE INVENTION

Problems to be Solved by the Invention

In a PDA spectrophotometer as described above, depending on the measurement wavelength range, there sometimes occurs a case in which high order diffracted light generated by the diffraction grating overlaps with first order diffracted light that is spectrally dispersed by the diffraction grating and enters the PDA. This influences the measurement result. Therefore, in such a case, a filter for removing high order diffracted light was arranged between the diffraction grating and the PDA to reduce the influence on the measurement due to the high order diffracted light (see Patent Document 2).

However, in the case of arranging a filter between the diffraction grating and the PDA, a frame member, a window plate, etc., for holding the filter is necessary. As a result, the light reflected by such a frame member, a window plate, etc., becomes stray light and enters the PDA, which may influence the measurement.

Therefore, the present invention aims to reduce influence on a measurement due to high order diffracted light without arranging a filter for removing high order diffracted light between a diffraction grating and a PDA.

Means for Solving the Problems

Most of the high order diffracted light incident on the PDA of the PDA spectrophotometer is second order diffracted light, and the contribution of the other high order diffracted light is slight as compared with the second order diffracted light. Therefore, if the detection signal value derived from the second order diffracted light can be removed from the detection signal value of the PDA, a value close to the detection signal value derived from the first order diffracted light incident on the PDA can be obtained, which can improve the detector accuracy.

As can be understood from the Young's interference condition formula $$d \sin \theta = m\lambda$$

where, "d" is a lattice constant, "$\theta$" is a detection position) (°, and "m" is an order (integer),
the second order diffracted light (m=2) of light of a certain wavelength overlaps with the first order diffracted light (m=1) in light having a wavelength twice the aforementioned certain wavelength. That is, the second order diffracted light of 200 nm overlaps with the light of 400 nm because the second order diffracted light comes to the same detection position as the light of 400 nm. In other words, when a light source that emits light in a certain wavelength range is used, the second order diffracted light in the short wavelength side wavelength range is detected in the long wavelength side wavelength range of the wavelength range in a state of being overlapped with the light in the long wavelength side wavelength range, and it will not be detected in a state of being overlapped with the second order diffracted light in the short wavelength side wavelength range.

Therefore, in the present invention, a certain range on the short wavelength side in the measurement wavelength range is defined as a first wavelength range and a range located on the longer wavelength side than the first wavelength range is defined as a second wavelength range so that the longest wavelength in the second wavelength range becomes approximately twice the longest wavelength in the first wavelength range wavelength range, a correction is performed so as to remove the detection signal value derived from the second order diffracted light of light in the first wavelength range included in the light in the second wavelength range.

That is, the correction method according to the present invention is a correction method of a detection signal value of the PDA of a spectrophotometer in which when a certain range of a measurement wavelength range on a short wavelength side is defined as a first wavelength range and a range of the measurement wavelength range on a longer wavelength side than the first wavelength range is defined as a second wavelength range, light in the measurement wavelength range in which a longest wavelength in the second wavelength range is substantially twice a longest wavelength in the first wavelength range is spectrally dispersed by a diffraction grating and guided to the photodiode array. The correction method includes:

a correction coefficient determination step of determining a correction coefficient related to a ratio of a portion of a detection signal value to the detection signal value, the portion of the detection signal value derived from a second order diffracted light of light in the first wavelength range contained in the detection signal value of a long wavelength side photodiode for detecting light in the second wavelength range in the PDA;

and a correction step of obtaining a corrected detection signal value derived from light in the second wavelength range among detection signal values of the long wavelength side photodiode using the correction coefficient determined in the correction coefficient determination step.

In the preferred embodiment, the correction coefficient determination step includes:

a first measurement step of measuring the detection signal value of the long wavelength side photodiode derived from the light in the second wavelength range by making light in the measurement wavelength range spectrally dispersed by the diffraction grating incident on the PDA and removing the light in the first wavelength range from light incident on the long wavelength side photodiode by using a second order diffracted light cutoff filter which does not allow transmission of the light in the first wavelength range but allow transmission of the light in the second wavelength range;

a second measurement step of measuring the detection signal value of the long wavelength side photodiode by making the light in the measurement wavelength range spectrally dispersed by the diffraction grating incident on the PDA without using the second order diffracted light cutoff filter; and a step of obtaining the correction coefficient by a ratio of a measurement value of the first measurement step to a measurement value of the second measurement step.

As described above, by comparing the detection signal value of the long wavelength side photodiode when using the second order diffracted light cutoff filter with the detection signal value of the long wavelength side photodiode when not using the second order diffracted light cutoff filter, the correction coefficient can be obtained. Here, the second order diffracted light cutoff filter has the property of transmitting light in the second wavelength range without transmitting light in the first wavelength range, but the transmittance of the light in the second wavelength range of the filter is not 100%. Therefore, when the second order diffracted light cutoff filter is used, the light in the second wavelength range is also attenuated somewhat.

Under the circumstances, in a preferred embodiment of the present invention, in the first measurement step, the detection signal value of the long wavelength side photodiode derived from the light in the second wavelength range is obtained in consideration of transmittance of the second order diffracted light cutoff filter. As a result, the correction coefficient can be determined in consideration of the light attenuation amount in the second wavelength range when the second order diffracted light cutoff filter is used. Therefore, it is possible to more accurately perform correction of the detection signal value.

In order to consider the transmittance of the filter of the second order diffracted light cutoff, it is necessary to know the transmittance of the second order diffracted light cutoff filter. It is also possible to use the representative value or the average value of the second order diffracted light cutoff filter as the transmittance of the second order diffracted light cutoff filter assuming that the transmittance is uniform throughout the second wavelength range. In order to obtain higher accuracy of the correction of the detection signal value, it is necessary to obtain an accurate transmittance of each wavelength component.

Under the circumstances, in a preferred embodiment of the present invention, the correction coefficient determination step further includes a transmittance measurement step of spectrally dispersing light in a wavelength range not including the first wavelength range but including the second wavelength range using the diffraction grating, making the spectrally dispersed light incident on the PDA, measuring a detection signal value of the long wavelength side photodiode when the second order diffracted light cutoff filter is not used and a detection signal value of the long wavelength side photodiode when the second order diffracted light cutoff filter is used, and obtaining the transmittance from a ratio of the measurement values. With this, an accurate transmittance of each wavelength component within the second wavelength range of the second order diffracted light cutoff filter is obtained, and therefore accurate correction of the detection signal value considering such accurate transmittance becomes possible.

The spectrophotometer according to the present invention has a function of correcting the detection signal value of the PDA using the above-mentioned correction method.

That is, the spectrophotometer according to the present invention, includes:

a light source in which when a certain range of a measurement wavelength range on a short wavelength side is defined as a first wavelength range and a range of the measurement wavelength range on a longer wavelength side than the first wavelength range is defined as a second wavelength range, the light source emits light in the measurement wavelength range in which a longest wavelength in the second wavelength range is substantially twice a longest wavelength of the first wavelength range;

a flow cell arranged on an optical path of light from the light source and configured to flow a sample;

a diffraction grating configured to spectrally disperse the light that passed through the flow cell for each wavelength component;

a PDA provided with a plurality of photodiodes for detecting a light quantity of incident light and configured to detect light spectrally dispersed by the diffraction grating for each wavelength component, the photodiode array including a long wavelength side photodiode for detecting light of the second wavelength range; and a computer, the computer being configured to:

retain a correction coefficient related to a ratio of a portion of a first detection signal value of the long wavelength side photodiode to the first detection signal value, the portion of the first detection signal value being derived from a second order diffracted light of light in the first wavelength range that contributes to the first detection signal, and obtain a corrected detection signal value representing a detection signal value contributed by light in the second wavelength range of a second detection signal value of the long wavelength side photodiode by using the retained correction coefficient.

Therefore, in the spectrophotometer according to the present invention, a filter for removing high order diffracted light is unnecessary between the diffraction grating and the photodiode array.

In a preferred embodiment, the light source includes a first light source configured to emit light in the measurement wavelength range and a second light source configured to emit light in the second wavelength range. In the transmittance measurement step that obtains the transmittance of the second order diffracted light cutoff filter used in the above correction method, the light in the wavelength range not including the first wavelength range but including the second wavelength range is used. Therefore, when a second light source configured to emit light in the second wavelength range is provided to the detector, the transmittance measurement step can be executed.

As an example of a combination of the first light source and the second light source, a combination of a deuterium lamp and a halogen lamp can be exemplified.

Effects of the Invention

In the correction method according to the present invention, a correction coefficient of the ratio of the portion of the detection signal value derived from the second order diffracted light of the light in the first wavelength range included in the detection signal value of the long wavelength side photodiode which detects the light in the second wavelength range in the PDA to the detection signal value is determined, and the detection signal value derived from the light in the second wavelength range out of the detection signal value of the long wavelength side photodiode is obtained by using its correction coefficient. Therefore, as the detection signal value of the long wavelength side photodiode, it is possible to obtain a detection signal value from which the detection signal value derived from the second order diffracted light is removed. This makes it possible to reduce the influence on the measurement result by high order diffracted light without using a filter for removing high order diffracted light.

The spectrophotometer according to the present invention has a function of correcting the detection signal value of the PDA using the above-mentioned correction method. Therefore, even if a filter for removing high order diffracted light is not arranged, a highly accurate detection signal from which the influence of high order diffracted light is excluded can be obtained. Therefore, it is unnecessary to dispose a filter for removing high order diffracted light between the diffraction grating and the PDA, and it is also possible to prevent light from being reflected by the frame material of the filter or the window plate to become stray light.

BRIEF DESCRIPTION OF THE DRAWINGS

FIG. 1 is a schematic configuration diagram showing an embodiment of a spectrophotometer.

EMBODIMENTS FOR CARRYING OUT THE INVENTION

An embodiment of a spectrophotometer will be described with reference to FIG. 1. Note that the spectrophotometer described here is merely an example of the configuration of a spectrophotometer to which the present invention can be applied, and the type and arrangement of the light source and the optical system can be changed as necessary.

In this embodiment, a certain range of the short wavelength side in the measurement wavelength range is defined as the first wavelength range, and a certain range of the longer wavelength side than the first wavelength range is defined as the second wavelength range. The longest wavelength in the second wavelength range is approximately twice the longest wavelength in the first wavelength range. The spectrophotometer of this embodiment is provided with a first light source 2 configured to emit light in the measurement wavelength range (first wavelength range and second wavelength range) and a second light source 4 configured to emit light in the second wavelength range. In this embodiment, a deuterium lamp that emits light of 200 nm to 800 nm is used as the first light source 2, and a halogen lamp that emits light of 400 nm to 800 nm is used as the second light source 4. That is, the measurement wavelength range in this embodiment is 200 nm to 800 nm.

The light emitted from the first light source 2 and the light emitted from the second light source 4 are combined by a half mirror and irradiated to the flow cell 10 via the condensing lens 8 as measurement light. The light that passed through the flow cell 10 is introduced into a detection unit having a mirror 14, a diffraction grating 16, and a PDA 18 via an inlet slit 12. The measurement light introduced into the detection unit via the inlet slit 12 is reflected by the mirror 14 and guided to the diffraction grating 16 and spectrally dispersed for each wavelength component. The light of each wavelength component spectrally dispersed by the diffraction grating 16 enters a predetermined photodiode of the PDA 18 arranged to detect light of each wavelength component, and is detected.

The detection signal of each photodiode of the PDA 18 is introduced to the processing unit 20. The processing unit 20 is provided with an operation unit 22, a correction coefficient retaining unit 24, and a correction unit 26. The processing unit 20 is realized by, for example, a dedicated computer or a general-purpose personal computer. The operation unit 22 and the correction unit 26 are functions obtained by executing a program stored in a storage device of such a computer by an arithmetic element. The correction coefficient retaining unit 24 is a function realized by a region of a part of the storage device of such a computer.

The operation unit 22 is configured to calculate the absorbance spectrum, etc., of a sample solution flowing through the flow cell 10 by calculation based on the detection signal fetched from the PDA 18. Here, as the detection signal value of the PDA 18, in addition to the detection signal value derived from the first order diffracted light of each wavelength component spectrally dispersed by the diffraction grating 16, a detection signal value derived from high order diffracted light generated in the diffraction grating 16 is included. Therefore, from the detection signal value fetched from the PDA 18, correction is performed to remove the detection signal value derived from the high order diffracted light. The operation unit 22 is configured to obtain an absorbance spectrum, etc., based on the corrected detection signal value.

The correction unit 26 is configured to perform correction of the detection signal value fetched from the PDA 18 using the following equation.

$$I'_\lambda = I_\lambda - K \times I_\lambda \qquad (1)$$

In the above equation (1), "$I_\lambda$" is a detection signal value of a photodiode that detects light of a wavelength $\lambda$, "$I'_\lambda$" is a detection signal value after correction of the photodiode that receives the light of a wavelength $\lambda$, and "K" is a correction coefficient. The correction coefficient K is a coefficient indicating the ratio of the detection signal value derived from the second order diffracted light to the detection signal value of each photodiode, and is an actual measurement value obtained in advance by measurement. The correction coefficient K is retained in the correction coefficient retaining unit 24.

Since the calculation of the absorbance spectrum, etc., based on the detection signal value corrected by the correction unit 26 is performed, the spectrophotometer of this embodiment does not have a filter for removing high order diffracted light between the diffraction grating 16 and the PDA 18. Therefore, a frame member, a window plate, etc., for holding such a filter becomes unnecessary, and the light reflected by these members does not enter the PDA 18 as stray light, so that the stray light is reduced and the detection sensitivity is improved.

Next, a method of determining the correction coefficient K using the spectrophotometer will be described below.

As described above, most of the high order diffracted light incident on the PDA 18 is second order diffracted light, and the contributions of the other high order diffracted light is slight as compared with the second order diffracted light. Therefore, by removing the detection signal value derived from the second order diffracted light from the detection signal value of the PDA, a value close to the detection signal value derived from the first order diffracted light incident on the PDA can be obtained.

Here, it is known that the second order diffracted light of the wavelength $\lambda/2$ is incident on the first order diffracted light of the wavelength $\lambda$ incident on the PDA 18 in an overlapped manner. Therefore, the detection signal value $I_\lambda$ of the photodiode detecting the light of wavelength $\lambda$ can be expressed by the following equation by using the detection signal value $I'_\lambda$ derived from the first order diffracted light of the wavelength $\lambda$ and the detection signal value $I_{ii\lambda/2}$ derived from the second order diffracted light of the light of the wavelength $\lambda/2$.

$$I_\lambda \approx I'_\lambda + I_{ii\lambda/2} \quad (2)$$

Here, if $$(I_{ii\lambda/2})/I_\lambda = K \quad (3)$$

the equation (2) is the same as the equation (1). That is, K is a coefficient representing the ratio of the detection signal value $I_{ii\lambda/2}$ derived from the second order diffracted light of the wavelength $\lambda/2$ light to the detection signal value $I_\lambda$ of the photodiode for detecting the light at the wavelength $\lambda$.

In order to obtain K, the first light source 2 and the second light source 4 are individually lighted, and the detection signal value of the PDA 18 is measured. The measurement will be described below using each light source.

<First Light Source: Deuterium Lamp>

In a state in which only the first light source 2 which is a deuterium lamp is lit, the detection signal value of the PDA 18 is measured. The deuterium lamp emits light having a wavelength of 200 nm to 800 nm. The second order diffracted light is detected in such a manner as to be overlapped with the first order diffracted light having a wavelength twice the wavelength of the second order diffracted light. Therefore, when a deuterium lamp is used, although the second order diffracted light does not overlap the light of 200 nm to 400 nm (first wavelength range), the second order diffracted light of 200 nm to 400 nm (first wavelength range) overlaps with the light of 400 nm to 800 nm (second wavelength range).

Therefore, in the range of 200 nm≤$\lambda$<400 nm, the detection signal value derived from the second order diffracted light is 0. Therefore, the above formula (3) is expressed as follows:

$$I_\lambda \approx I'_\lambda + 0$$

Therefore, K becomes zero (K=0).

On the other hand, as for the range of 400 nm≤$\lambda$≤800 nm, the correction coefficient K is determined by comparing the detection signal values between when using the second order diffracted light cutoff filter that does not transmit light of wavelength 200 nm to 400 nm (first wavelength range) but transmits light of 400 nm to 800 nm (second wavelength range) and when not using the same.

First, the detection signal value $I_{1\lambda}$ is measured without using the second order diffracted light cutoff filter. Since the measured detection signal value $I_{1\lambda}$ includes the detection signal value $I_{1ii\lambda/2}$ derived from second order diffracted light, the measured detection signal value $I_{1\lambda}$ can be expressed as follows.

$$I_{1\lambda} \approx I'_{1\lambda} + I_{1ii\lambda/2} = I'_{1\lambda} + K \times I_{1\lambda} \quad (4)$$

Next, the detection signal value $I_{1\lambda(filter)}$ is measured by using the second order diffracted light cutoff filter. Since the measured detection signal value $I_{1\lambda(filter)}$ does not include the detection signal value derived from the second order diffracted light, it can be said that this detection signal includes only the detection signal value $I'\zeta_{1\lambda}$ derived from first order diffracted light. However, considering the transmittance T in the second order diffracted light cutoff filter at 400 nm to 800 nm (second wavelength range), the detection signal value $I_{1\lambda(filter)}$ can be expressed as follows.

$$I_{1\lambda(filter)} = T \times I'_{1\lambda} \quad (5)$$

Therefore, from the above equations (4) and (5), the correction coefficient K can be expressed as follows:

$$K = 1 - I_{1\lambda(filter)}/(T \times I_{1\lambda}) \quad (6)$$

Here, in the case of not considering the transmittance T of the second order diffracted light cutoff filter, K can be obtained by setting T in the above equation (6) to 1. Also, on the assumption that the transmittance T of the second order diffracted light cutoff filter in this second wavelength range is uniform, its representative value and average value (for example 0.97) may be used. In the case of not considering the transmittance T (T=1) or using the representative value of T or the like, it is not necessary to perform measurement using the second light source 4 (halogen lamp) described below.

<Second Light Source: Halogen Lamp>

Next, in order to accurately obtain the transmittance T in the above equation (5), measurements of the detection signal values are performed in the case in which the second light source 4 is lit and the above second order diffracted light cutoff filter is used and in the case in which the second light source 4 is lit and the above second order diffracted light cutoff filter is not used. The second light source 4 which is a halogen lamp emits light of 400 nm to 800 nm (second wavelength range). When only the second light source 4 is turned on, since there is no light of wavelength 200 nm to 400 nm (first wavelength range), the second order diffracted light does not enter the photodiode detecting light of this second wavelength range.

First, the detection signal value $I_{2\lambda}$ is measured without using the second order diffracted light cutoff filter. Since the measured detection signal value $I_{2\lambda}$ does not include the detection signal value derived from the second order diffracted light, the measured detection signal value $I_{2\lambda}$ can be expressed as follows.

$$I_{2\lambda} = I'_{2\lambda} \quad (7)$$

Next, the detection signal value $I_{2\lambda(filter)}$ is measured by using the second order diffracted light cutoff filter. The measured detection signal value $I_{2\lambda(filter)}$ can be expressed as follows.

$$I_{2\lambda(filter)} = T \times I'_{2\lambda} \quad (8)$$

From the above equations (7) and (8), T can be obtained as follows:

$$T = I_{2\lambda(filter)}/I_{2\lambda} \quad (9)$$

By applying T obtained by the above equation (9) to the above equation (6), it is possible to obtain an accurate correction coefficient K in consideration of the transmittance T of the second order diffracted light cutoff filter.

DESCRIPTION OF REFERENCE SYMBOLS

2 first light source
4 second light source 6 half mirror
8 condensing lens
10 flow cell
12 inlet slit
14 mirror
16 diffraction grating
18 photodiode array (PDA)
20 processing unit
22 operation unit
24 correction coefficient retaining unit
26 correction unit

The invention claimed is:

1. A correction method of a detection signal value of a photodiode array of a spectrophotometer in which when a certain range of a measurement wavelength range on a short wavelength side is defined as a first wavelength range and a range of the measurement wavelength range on a longer wavelength side than the first wavelength range is defined as a second wavelength range, light of the measurement wavelength range in which a longest wavelength in the second wavelength range is substantially twice a longest wavelength of the first wavelength range is spectrally dispersed by a diffraction grating and guided to the photodiode array, the correction method comprising:
 a correction coefficient determination step of determining a correction coefficient related to a ratio of a portion of a detection signal value to the detection signal value, the portion of the detection signal value derived from a second order diffracted light of light in the first wavelength range contained in the detection signal value of a long wavelength side photodiode for detecting light in the second wavelength range in the photodiode array; and
 a correction step of obtaining a corrected detection signal value derived from light in the second wavelength range among detection signal values of the long wavelength side photodiode using the correction coefficient determined in the correction coefficient determination step.

2. The correction method as recited in claim 1,
wherein the correction coefficient determination step includes:
 a first measurement step of measuring the detection signal value of the long wavelength side photodiode derived from the light in the second wavelength range by making light in the measurement wavelength range spectrally dispersed by the diffraction grating incident on the photodiode array and removing the light in the first wavelength range from light incident on the long wavelength side photodiode by using a second order diffracted light cutoff filter which does not allow transmission of the light in the first wavelength range but allow transmission of the light in the second wavelength range;
 a second measurement step of measuring the detection signal value of the long wavelength side photodiode by making the light in the measurement wavelength range spectrally dispersed by the diffraction grating incident on the photodiode array without using the second order diffracted light cutoff filter; and
 a step of obtaining the correction coefficient from a ratio of a measurement value of the first measurement step to a measurement value of the second measurement step.

3. The correction method as recited in claim 2,
wherein in the first measurement step, the detection signal value of the long wavelength side photodiode derived from the light in the second wavelength range is obtained in consideration of transmittance of the second order diffracted light cutoff filter.

4. The correction method as recited in claim 3,
wherein the correction coefficient determination step further includes a transmittance measurement step of spectrally dispersing light in a wavelength range not including the first wavelength range but including the second wavelength range using the diffraction grating, making the spectrally dispersed light incident on the photodiode array, measuring a detection signal value of the long wavelength side photodiode when the second order diffracted light cutoff filter is not used and a detection signal value of the long wavelength side photodiode when the second order diffracted light cutoff filter is used, and obtaining the transmittance from a ratio of the measurement values.

5. A spectrophotometer comprising:
 a light source in which when a certain range of a measurement wavelength range on a short wavelength side is defined as a first wavelength range and a range of the measurement wavelength range on a longer wavelength side than the first wavelength range is defined as a second wavelength range, the light source being configured to emit light in the measurement wavelength range in which a longest wavelength in the second wavelength range is substantially twice a longest wavelength of the first wavelength range;
 a flow cell arranged on an optical path of light from the light source and configured to flow a sample;
 a diffraction grating configured to spectrally disperse the light that passed through the flow cell for each wavelength component;
 a photodiode array provided with a plurality of photodiodes for detecting a light quantity of incident light and configured to detect light spectrally dispersed by the diffraction grating for each wavelength component, the photodiode array including a long wavelength side photodiode for detecting light of the second wavelength range; and
 a computer, the computer being configured to:
  retain a correction coefficient related to a ratio of a portion of a first detection signal value of the long wavelength side photodiode to the first detection signal value, the portion of the first detection signal value being derived from a second order diffracted light of light in the first wavelength range that contributes to the first detection signal, and
 obtain a corrected detection signal value representing a detection signal value contributed by light in the second wavelength range of a second detection signal value of the long wavelength side photodiode by using the retained correction coefficient.

6. The spectrophotometer as recited in claim 5,
wherein a filter for removing high order diffracted light is not arranged between the diffraction grating and the photodiode array.

7. The spectrophotometer as recited in claim 5,
wherein a first light source configured to emit light in the measurement wavelength range and a second light source configured to emit light in the second wavelength range are included as the light source.

8. The spectrophotometer as recited in claim 6,
wherein a first light source configured to emit light in the measurement wavelength range and a second light source configured to emit light in the second wavelength range are included as the light source.

9. The spectrophotometer as recited in claim 7, wherein the first light source is a deuterium lamp and the second light source is a halogen lamp.

10. The spectrophotometer as recited in claim 8, wherein the first light source is a deuterium lamp and the second light source is a halogen lamp.

* * * * *